(12) United States Patent
Shimizu et al.

(10) Patent No.: US 6,892,024 B1
(45) Date of Patent: May 10, 2005

(54) INFORMATION RECORDING APPARATUS

(75) Inventors: Yuji Shimizu, Saitama-ken (JP);
Eisaku Kawano, Saitama-ken (JP);
Takashi Irisawa, Saitama-ken (JP);
Takahiro Horiuchi, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/414,600

(22) Filed: Oct. 8, 1999

(30) Foreign Application Priority Data

Oct. 8, 1998 (JP) .......................................... P10-287030

(51) Int. Cl.$^7$ .............................. H04N 7/26; H04N 5/85; H04N 5/91
(52) U.S. Cl. ........................ 386/109; 386/125; 386/46
(58) Field of Search ................................ 386/109, 111, 386/112, 27, 33, 26, 125, 126, 124, 45–52, 39, 40, 96, 99, 104, 92, 95, 66, 70, 81, 82; H04N 7/26, 5/85, 5/91

(56) References Cited

U.S. PATENT DOCUMENTS 5,504,585 A * 4/1996 Fujinami et al.
5,737,481 A * 4/1998 Gushima et al.

FOREIGN PATENT DOCUMENTS

| JP | 5-274792 | 10/1993 |
|----|----------|---------|
| JP | 7-210923 | 8/1995 |
| JP | 8-22674 | 1/1996 |
| JP | 11-103444 | 4/1999 |
| JP | 11-259976 | 9/1999 |

* cited by examiner

*Primary Examiner*—Robert Chevalier
(74) *Attorney, Agent, or Firm*—Young & Thompson

(57) ABSTRACT

An information recording apparatus includes: a transferring device that separately and simultaneously receives at least two information supplied through at least two channels, and separately and simultaneously transfers the at least two information to a storing device at separate transfer rates, thereby storing the at least two information into the storing device; a recording device that alternately reads the at least two information from the storing device, and alternately records the at least two information read from the storing device onto a recording medium at a constant recording rate; and a transfer rate setting device that sets the respective transfer rates to make a total of the transfer rates smaller than the recording rate.

12 Claims, 13 Drawing Sheets

INFORMATION RECORDING APPARATUS

BACKGROUND OF THE INVENTION

1. Field of the Invention

The present invention relates to an information recording apparatus for recording information such as a picture image in a recording medium such as an optical disk.

2. Description of the Related Art

As an apparatus for recording a program broadcast from a TV broadcast station, a VTR (video tape recorder) is known. In general, analog system VTRs are used widely, but recently, digital system VTRs are spreading as well. It is characteristic of the digital system VTRs to provide a higher image quality compared with the analog system VTRs.

These days, with the number of channels of the TV broadcast increasing, it is very convenient if TV programs of a plurality of channels can be recorded at the same time. However, in the case of a VTR, only one program can be recorded at one time. That is, a VTR can record only one channel simultaneously.

SUMMARY OF THE INVENTION

An object of the present invention is to provide an information recording apparatus capable of recording the information of a plurality of channels at the same time.

An information recording apparatus in accordance with the present invention includes: a transferring device that separately and simultaneously receives at least two information supplied through at least two channels, and separately and simultaneously transfers the at least two information to a storing device at separate transfer rates, thereby storing the at least two information into the storing device; a recording device that alternately reads the at least two information from the storing device, and alternately records the at least two information read from the storing device onto a recording medium at a constant recording rate; and a transfer rate setting device that sets the respective transfer rates to make a total of the transfer rates smaller than the recording rate.

At least two information are separately and simultaneously supplied to the information recording apparatus through at least two channels. In the information recording apparatus, the transferring device separately and simultaneously receives these information, and separately and simultaneously transfers these information to the storing device to store the information into the storing device. Thus, the receiving operation, transferring operation and storing operation are performed in a parallel manner.

Furthermore, the transferring device transfers at least two information to the storing device at separate transfer rates. For example, if it is assumed that the transferring device transfers first information and second information to the storing device, the transferring device transfers the first information at a first transfer rate, and transfers the second information at a second transfer rate. The first transfer rate and the second transfer rate are separately set by the transfer rate setting device.

The recording device alternately reads the at least two information from the storing device, and alternately records these information onto a recording medium at a constant recording rate. For example, if it is assumed that the first information and the second information are stored in the storing device, the recording device firstly reads the first information from the storing device and records it onto the recording medium at the constant recording rate. The recording device next reads the second information from the storing device and records it onto the recording medium at the same recording rate. The recording device performed such reading and recording operations repeatedly.

The transfer rate setting device sets the respective transfer rates to make a total of the transfer rates smaller than the recording rate. As a result, the speed of reading information from the storing device is faster than the speed of storing information into the storing device. Therefore, it is possible to prevent overflow of the information in the storing device.

Thus, according to the information reproducing apparatus, simultaneous recording of a plurality of information can be substantially achieved.

In the aforementioned information recording apparatus, the transferring device may includes a compression device that separately compresses the at least two information at separate compression ratios, and the transfer rate setting device may includes a compression ratio setting device that sets the respective compression ratios to make the total of the transfer rates smaller than the recording rate.

In general, the amount of the information can be reduced by compression of the information. If the compression ratio is changed, the amount of the compressed information can be changed. If the compression ratio is changed, the quality of the information, such as the quality of image, the quality of sounds or the like, is also changed.

The compression device separately compresses the at least two information at separate compression ratios. Therefore, the quality of each information can be set separately. Here, it should be noted that there is a relation between the compression ratios of the information and the transfer rates of the information in the transferring device. So, when setting the compression ratios, it is needed to consider maintaining the state that the total of the transfer rates is smaller than the recording rate, in order to prevent overflow of the information in the storing device. Therefore, the compression ratio setting device sets the respective compression ratios to make the total of the transfer rates smaller than the recording rate.

Furthermore, in the aforementioned information recording apparatus, the recording device may includes: a selection device that alternately selects one of the at least two information stored in the storing device; a detection device that detects an amount of each of the at least two information stored in the storing device; a determination device that determines on the basis of a detection by the detection device whether or not the amount of the one of the at least two information selected by the selection device reaches a predetermined amount; a recording control device that records the one of the at least two information selected by the selection device onto the recording medium when the determination device determines that the amount of the one of the at least two information selected by the selection device reaches the predetermined amount.

Thus, the selected information is recorded onto the recording medium, each time the amount of the selected information reaches the predetermined amount in the storing device, and such an operation is alternately and repeatedly performed on the at least two information stored in the storing device. Therefore, equal amounts of at least two information are alternately recorded onto the recording medium, so that the efficiency of recording can be improved.

Furthermore, in the aforementioned information recording apparatus, the recording device may continuously arrange the at least two information read from the storing device on a recording medium in a reading order. Thus, the efficiency of recording can be improved.

Moreover, in the aforementioned information recording apparatus, the recording device may continuously arrange one of the at least two information read from the storing device on a first area on the recording medium, and continuously arrange another one of the at least two information read from the storing device on a second area on the recording medium. In this case, the first area and the second area are separately formed on the recording medium. Thus, the at least two information can be separately recorded in the separate areas, and in each area, only the information supplied through a single channel can be continuously arranged. Therefore, when reproducing the information from the recording medium, the reproduction of the information can be achieved by a simple reading operation, so that the efficiency of reading information can be improved.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Hereinafter embodiments of the present invention will be explained with reference to the accompanied drawings. In the embodiments described below, examples with a recording apparatus according to the present invention adopted in a DVD-R recording/reproducing apparatus will be presented.

1. First Embodiment

Figure 1:
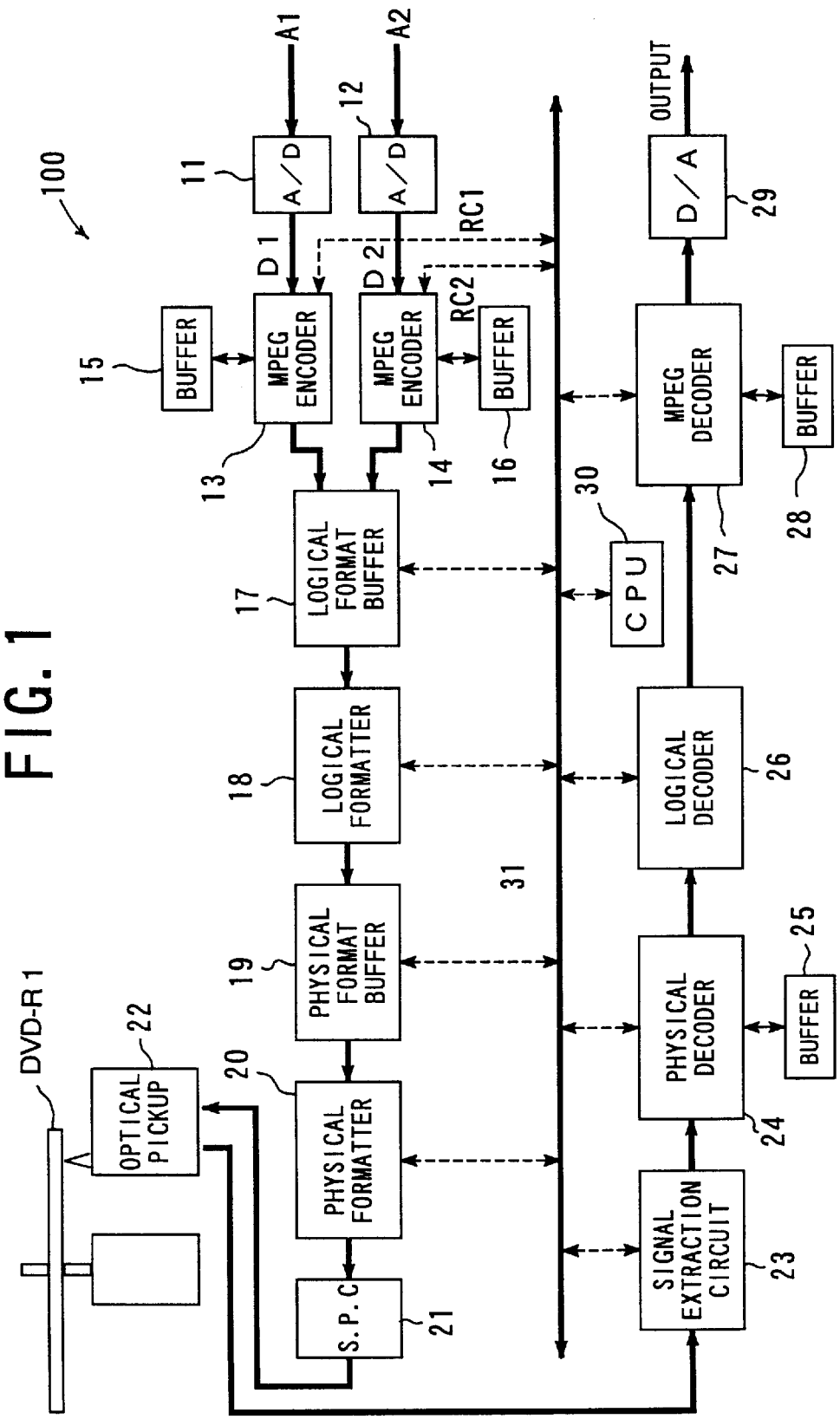
FIG. 1 is a block diagram showing a recording/reproducing apparatus according to a first embodiment of the present invention.

FIG. 1 shows a DVD-R recording/reproducing apparatus 100 according to the first embodiment of the present invention. The recording/reproducing apparatus 100 can receive two channel picture image signals A1 and A2 simultaneously so as to record image data D1 and D2 corresponding to the picture image signals A1 and A2 in a DVD-R 1 simultaneously. Moreover, the apparatus 100 can reproduce either one of the two channel picture image signals D1 and D2 selectively from the DVD-R 1 with the two channel picture image data D1 and D2 recorded.

The configuration of the recording/reproducing apparatus 100 will be explained with reference to FIG. 1. The recording/reproducing apparatus 100 includes two analog-digital converters (hereinafter referred to as "A/D converters") 11 and 12, two MPEG encoders 13 and 14, MPEG encoder buffers 15 and 16, a logical format buffer 17, a logical formatter 18, a physical format buffer 19, a physical formatter 20, a signal processing circuit (S.P.C) 21, and an optical pickup 22. These elements comprise a recording section in the recording/reproducing apparatus 100.

Furthermore, the recording/reproducing apparatus 100 includes a signal extraction circuit 23, a physical decoder 24, a buffer 25, a logical decoder 26, an MPEG decoder 27, an MPEG decoder buffer 28, and a digital-analog converter (hereinafter referred to as "D/A converter") 29. These elements comprise a reproducing section in the recording/reproducing apparatus 100.

The A/D converter 11 is a device for converting an analog picture image signal A1 to digital picture image data D1. The A/D converter 12 is a device for converting an analog picture image signal A2 to digital picture image data D2. The two A/D converters 11 and 12 have the same configuration. The picture image signals A1 and A2 are, for example, video signals broadcast from a TV broadcasting station. The recording/reproducing apparatus 100 according to this embodiment can receive the two channel picture image signals A1 and A2 simultaneously. The signals broadcast from a TV broadcasting station include not only picture signals but also sound signals, however, the case of a picture image signal will be explained in this embodiment.

Figure 2:
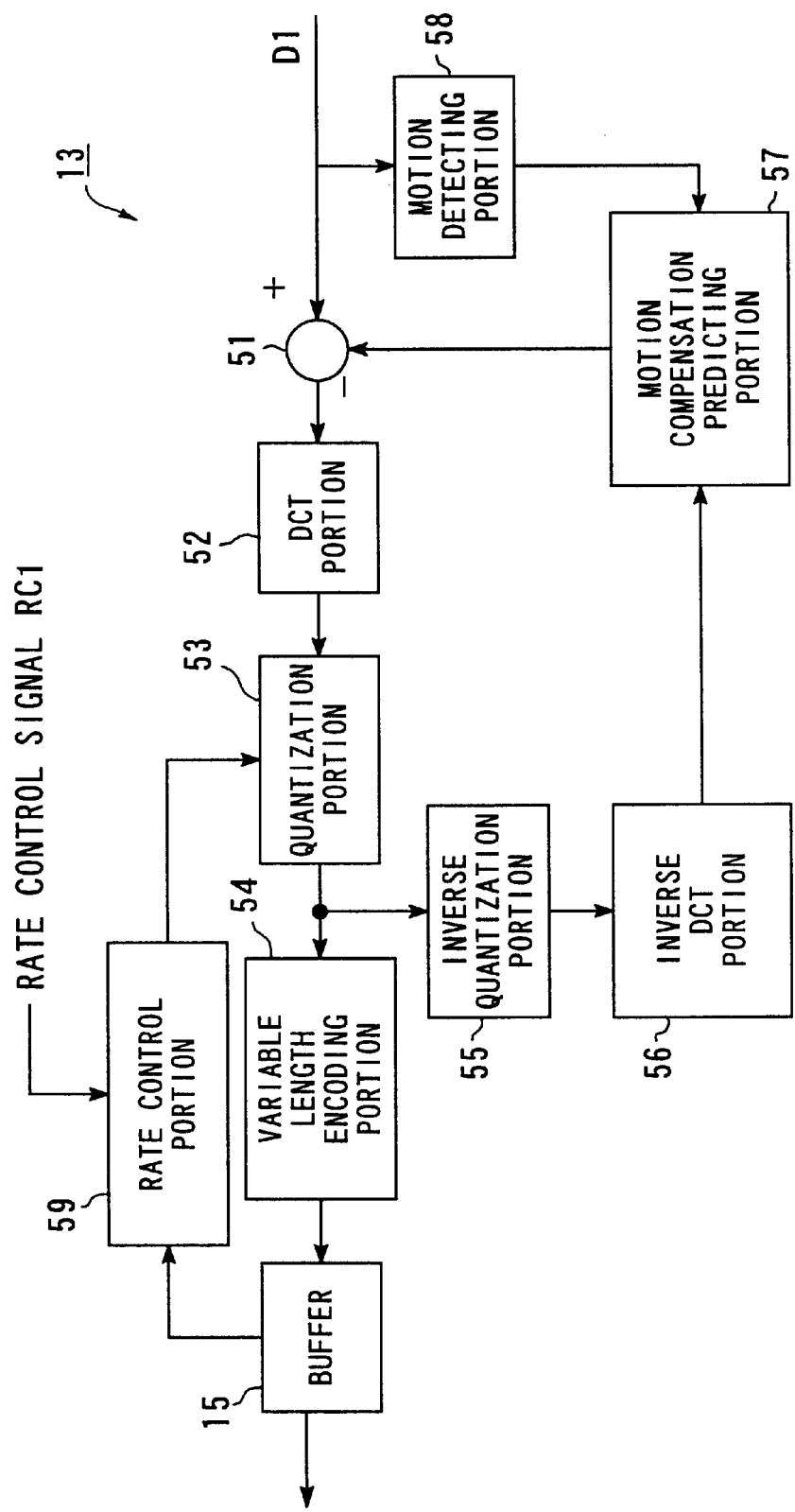
FIG. 2 is a block diagram showing an MPEG encoder provided in the recording/reproducing apparatus according to the first embodiment of the present invention.

The MPEG encoder 13 is for compressing (encoding) picture image data output from the A/D converter 11 according to the MPEG (Moving Picture Experts Group) system. As shown in FIG. 2, the MPEG encoder 13 includes a subtraction portion 51, a DCT portion 52, a quantization portion 53, a variable length encoding portion 54, an inverse quantization portion 55, an inverse DCT portion 56, a motion compensation predicting portion 57, a motion detecting portion 58, a rate control portion 59, and a buffer 15.

The picture image data D1 (D2) are sectioned per frame, and the data pieces corresponding to individual picture images are assigned to respective frames. Specifically, in the picture image data D1 (D2), each of the data pieces assigned to the respective frames is pixel data representing the individual picture image.

The MPEG encoder 13 divides the picture image data D1 into a plurality of blocks so as to execute a compression process per block. In this compression process, when the pixel data comprising one block of the picture image data D1 are input to the MPEG encoder 13, the subtraction portion 51 calculates the difference between the input pixel data and motion predicting data output from the motion compensation predicting portion 57 so as to output the result as the difference data. Then, the DCT portion 52 executes the discrete cosine transformation of the difference data output from the subtraction portion 51. The quantization portion 53 quantizes the data applied with the discrete cosine transformation. The variable length encoding portion 54 applies the variable length coding process to the quantized data so as to output the obtained data to the buffer 15. On the other hand, the inverse quantization portion 55 inversely quantizes the data quantized by the quantization portion 53, and the inverse DCT portion 56 applies the inverse DCT to the inversely quantized data so as to output the same to the motion compensation predicting portion 57. Moreover, the motion detecting portion 58 detects the motion vector of the image from the pixel data input to the subtraction portion 51 so as to output the same to the motion compensation predicting portion 57. The motion compensation predicting portion 57 executes the frame prediction according to the MPEG system, using the inversely DTC data and the motion vector so as to produce prediction data and output the same to the subtraction portion 51. Moreover, the rate control portion 59 is for controlling the quantization rate in the quantization portion 53 variably. The compression process executed in the MPEG encoder 13 itself is known by those skilled in the art, and the above-mentioned configuration of the MPEG encoder 13 is typical one for realizing the compression technique.

However, the MPEG encoder 13 according to the embodiment of the present invention further has a function of varying the quantization rate in the quantization portion 53 in addition to the above-mentioned typical function. That is, in the MPEG encoder 13, the rate control portion 59 is connected with a CPU 30 described later. Accordingly, the MPEG encoder 13 according to the embodiment of the present invention can change the quantization rate in the quantization portion 53 according to a rate control signal RC1 output from the CPU 30.

The MPEG encoder 14 is for encoding (compressing) picture image data output from the A/D converter 12 according to the MPEG system with the configuration the same as the MPEG encoder 13. Moreover, the MPEG encoder 14 can change the quantization rate in the quantization portion 53 provided in the MPEG encoder 14 according to a rate control signal RC2 output from the CPU 30.

Figure 3:
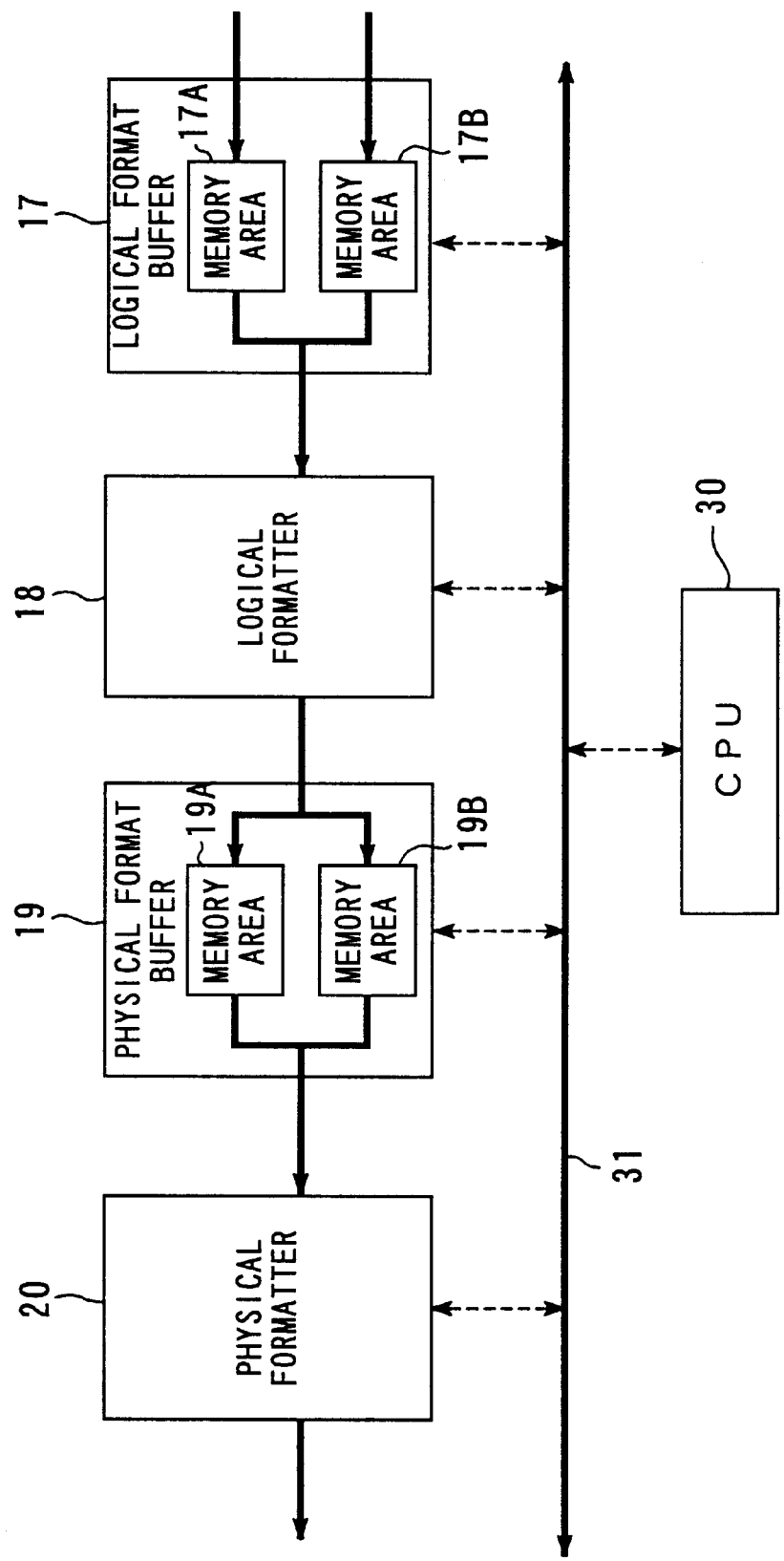
FIG. 3 is a block diagram showing a logical format buffer, a logical formatter, a physical format buffer, a physical formatter, and the like, according to the first embodiment of the present invention.

As shown in FIG. 3, the logical format buffer 17 is a memory device for temporarily storing the picture image data D1 and D2 compressed and output by the MPEG encoders 13 and 14. The logical format buffer 17 is, for example, a RAM (random access memory). A memory area 17A for storing the picture image data D1 and a memory area 17B for storing the picture image data D2 are formed in the logical format buffer 17. The logical format buffer 17 is connected with the CPU 30 so as to store the picture image data D1 output from the MPEG encoder 13 in the memory area 17A and the picture image data D2 output from the MPEG encoder 14 in the memory area 17B according to a write control signal output from the CPU 30. Moreover, the logical format buffer 17 outputs the picture image data D1 stored in the memory area 17A or the picture image data D2 stored in the memory area 17B to the logical formatter 18 according to a read control signal output from the CPU 30. Whether to output the picture image data D1 stored in the memory area 17A or output the picture image data D2 stored in the memory area 17B is selected according to an address signal output from the CPU 30.

The logical formatter 18 is for converting the formats of the picture image data D1 and D2 output from the logical format buffer 17 to the DVD standard logical format, respectively.

As shown in FIG. 3, the physical format buffer 19 is a memory device for temporarily storing the picture image data D1 and D2 each output from the logical formatter 18. The physical format buffer is, for example, a RAM. A memory area 19A for storing the picture image data D1 and a memory area 19B for storing the picture image data D2 are formed in the physical format buffer 19. The physical format buffer 19 is connected with the CPU 30 so as to store the picture image data D1 output from the logical formatter 18 in the memory area 19A and the picture image data D2 output from the logical formatter 18 in the memory area 19B according to a write control signal output from the CPU 30. Moreover, the physical format buffer 19 outputs the picture image data D1 stored in the memory area 19A or the picture image data D2 stored in the memory area 19B to the physical formatter 20 according to a read control signal output from the CPU 30. Whether to output the picture image data D1 stored in the memory area 19A or output the picture image data D2 stored in the memory area 19B is selected according- to an address signal output from the CPU 30. Furthermore, the physical format buffer 19 outputs a data amount signal showing each amount of the picture image data D1 and D2 stored in the memory areas 19A and 19B to the CPU 30.

The physical formatter 20 is for converting the formats of the picture image data D1 and D2 output from the physical format buffer 19 to the DVD standard physical format, respectively.

The signal processing circuit 21 is for converting the picture image data D1 and D2 output from the physical formatter 20 to NRZI (non return to zero inverse) signals and applying a waveform conversion process to the NRZI signals for improving the shape of a pit formed in the DVD-R 1.

The optical pickup 22 is for irradiating a light beam to the DVD-R 1 so as to record the NRZI signals (picture image data D1 and D2) onto the DVD-R 1. Moreover, the optical pickup 22 converts the light beam reflected by the DVD-R 1 into an electric signal so as to output the same as a read signal to the signal extraction circuit 23.

The signal extraction circuit 23 extracts a reproduction signal and a control signal from the read signals output from the optical pickup 22. The control signal is used for the focusing servo control and the tracking servo control. The reproduction signal is output to the physical decoder 24.

The physical decoder 24 is for decoding a reproduction signal output from the signal extraction circuit 23 according to the decoding system corresponding to the above-mentioned physical formatter 20. The logical decoder 26 is for decoding the data output from the physical decoder according to the decoding system corresponding to the above-mentioned logical formatter 18. Furthermore, the MPEG decoder 27 is for decompressing the data output from the logical decoder 26 according to the decompressing (decoding) system corresponding to the above-mentioned MPEG encoders 13 and 14. The digital-analog converter 29 is for converting the picture image data decoded and decompressed by the physical decoder 24, the logical decoder 26 and the MPEG decoder 27 to an analog picture image signal and outputting the same.

The CPU 30 changes the "transfer rate of the picture image data D1" and "the transfer rate of the picture image data D2" independently, using the rate control signal RC1 or RC2 as described later. Moreover, the CPU 30 controls the selection of the memory area 17A or 17B in the logical format buffer 17, the writing operation of the picture image data D1 and D2 in the memory areas 17A and 17B, and the reading operation of the picture image data D1 and D2 from the memory areas 17A and 17B, using an address signal, a write control signal and a read control signal. Furthermore, the CPU 30 controls the selection of the memory area 19A or 19B in the physical format buffer 19, the writing operation of the picture image data D1 and D2 in the memory areas 19A and 19B, and the reading operation of the picture image data D1 and D2 from the memory areas 19A and 19B, using another address signal, another write control signal and another read control signal. Moreover, the CPU 30 receives a data amount signal output from the physical format buffer so as to monitor (detect) the amount of the image data D1 and D2 stored each in the memory areas 19A and 19B of the physical format buffer 19 based on the data amount signal. In addition thereto, the CPU 30 controls the logical formatter 17, the physical formatter 20, the signal extraction circuit 23, the physical decoder 24, the logical decoder 26, the MPEG decoder 27, or the like.

Then, the "transfer rate of the picture image data D1", the "transfer rate of the picture image data D2" and a "recording rate" will be explained.

The "transfer rate of the picture image data D1" stands for the amount of the picture image data D1 written in the memory area 17A of the logical format buffer 17 per unit time. The "transfer rate of the picture image data D1" is determined on the whole by the quantization rate in the quantization portion 53 of the MPEG encoder 13. Further specifically, since the compression ratio of the picture image data D1 is reduced if the quantization rate in the quantization portion 53 is increased, the data amount of the picture image data D1 output from the MPEG encoder 13 per unit time is increased. As a result, the "transfer rate of the picture image data D1" is increased. On the other hand, since the compression ratio of the picture image data D1 is increased if the quantization rate in the quantization portion 53 is reduced, the data amount of the picture image data D1 output from the MPEG encoder 13 per unit time is reduced. As a result, the "transfer rate of the picture image data D1" is reduced.

The "transfer rate of the picture image data D2" stands for the amount of the picture image data D2 written in the memory area 17B of the logical format buffer 17 per unit time. The "transfer rate of the picture image data D2" is determined on the whole by the quantization rate in the quantization portion 53 of the MPEG encoder 14.

Moreover, as mentioned above, the "transfer rate of the picture image data D1" and the "transfer rate of the picture image data D2" can vary according to the control of the CPU 30. The CPU 30 changes the quantization rate in the quantization portion 53 of the MPEG encoder 13, using a rate control signal RC1. Accordingly, the "transfer rate of the picture image data D1" is changed. Similarly, the CPU 30 changes the quantization rate in the quantization portion 53 of the MPEG encoder 14, using a rate control signal RC2. Accordingly, the "transfer rate of the picture image data D2" is changed.

Furthermore, the "transfer rate of the picture image data D1" and the "transfer rate of the picture image data D2" are controlled such that the upper limit of the total value thereof (hereinafter referred to as the "total upper limit value") is the same as or less than the amount of the picture image data D1 or D2 read out from the logical format buffer 17 by the logical formatter 18 per unit time. This is for preventing the overflow of the logical format buffer 17. The amount of the picture image data D1 or D2 read out from the logical format buffer 17 by the logical formatter 18 per unit time depends on the output rate (the amount of the output picture image data per unit time) of the logical formatter 18. Since the output rate of the logical formatter 18 is, for example, about 10.08 Mbps, the "transfer rate of the picture image data D1" and the "transfer rate of the picture image data D2" are controlled so that the total upper limit value can be, for example, 10 M bit.

On the other hand, the "recording rate" stands for the amount of the picture image data recorded in the DVD-R 1 per unit time. The "recording rate" is determined on the whole by the output rate of the physical formatter 20. Here, the amount of the picture image data D1 or D2 written in the physical format buffer 19 per unit time needs to be the same as or less than the amount of the picture image data D1 or D2 read out from the physical format buffer 19 by the physical formatter 20 per unit time in order to prevent the overflow of the physical format buffer 19. The amount of the picture image data D1 or D2 read out from the physical format buffer 19 by the physical formatter 20 per unit time is determined on the whole by the output rate of the physical formatter 20. Moreover, the amount of the picture image data D1 or D2 written in the physical format buffer 19 per unit time is determined by the output rate of the logical formatter 18. Therefore, at least the output rate of the physical formatter 20 needs to be higher than the output rate of the logical formatter 18. In consideration thereof, the output rate of the physical formatter 20 is, for example, about 11.08 Mbps. In this case, the "recording rate" becomes substantially 11.08 Mbps.

As a result, each rate is set in the recording/reproducing apparatus 100 such that the "transfer rate of the picture image data D1" and the "transfer rate of the picture image data D2" can always be lower than the "recording rate".

The recording operation of the recording/reproducing apparatus 100 according to this embodiment will be explained with reference to FIGS. 4 to 8.

Figure 4:
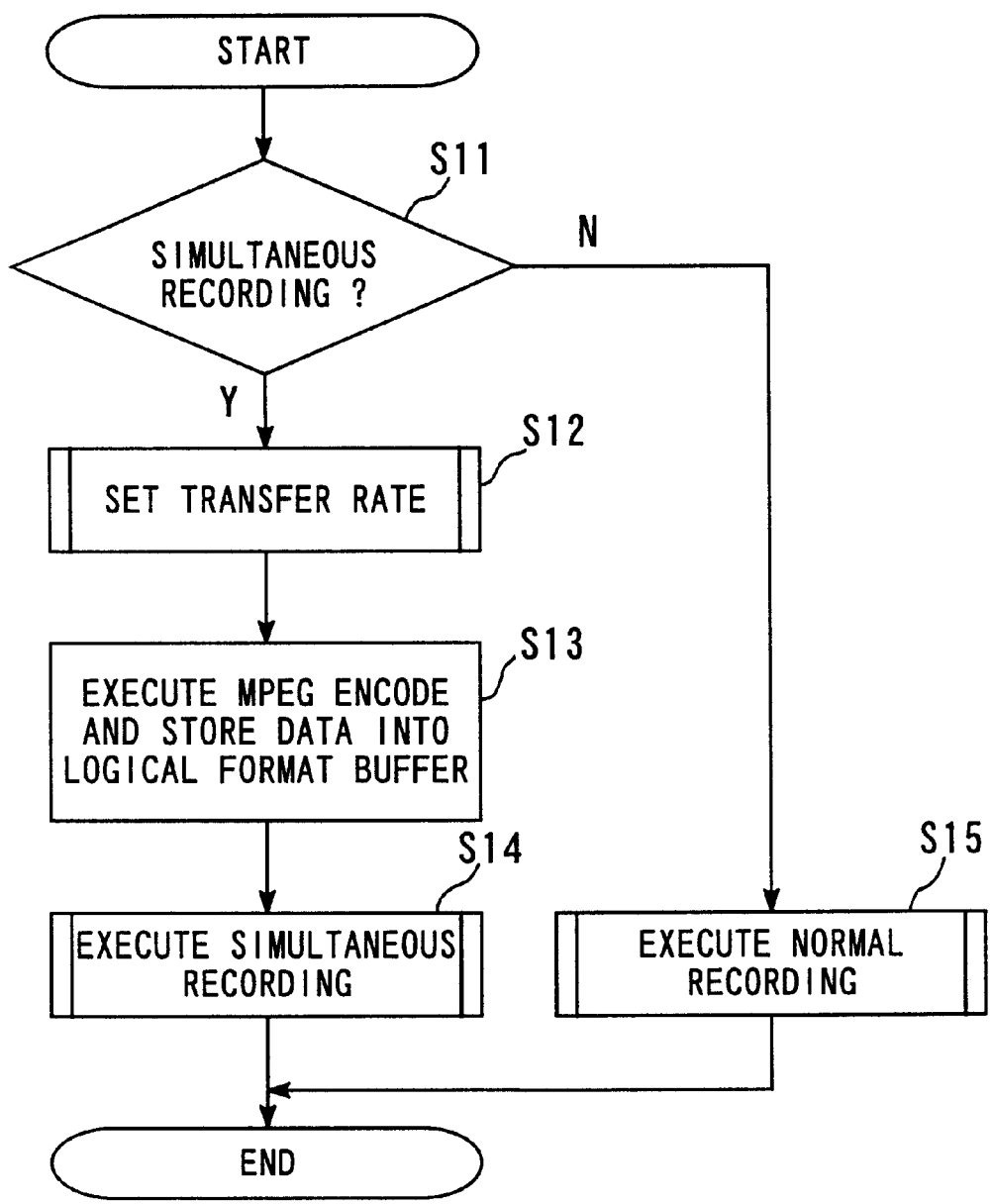
FIG. 4 is a flow chart showing a recording operation according to the first embodiment of the present invention.

FIG. 4 shows the main program of the recording operation. When the recording operation starts, the CPU 30 executes the recording operation according to the main program. As shown in FIG. 4, the CPU 30 determines, first, whether or not to execute the two channel simultaneous recording (step 11). Whether or not to execute the two channel simultaneous recording is determined on the basis of the manual command by a user. For example, when the user operates an operation panel (not illustrated) provided in the recording/reproducing apparatus 100 for inputting the command of executing the two channel simultaneous recording, the CPU 30 continues the process to the step 12 so as to execute the transfer rate setting process.

Figure 5:
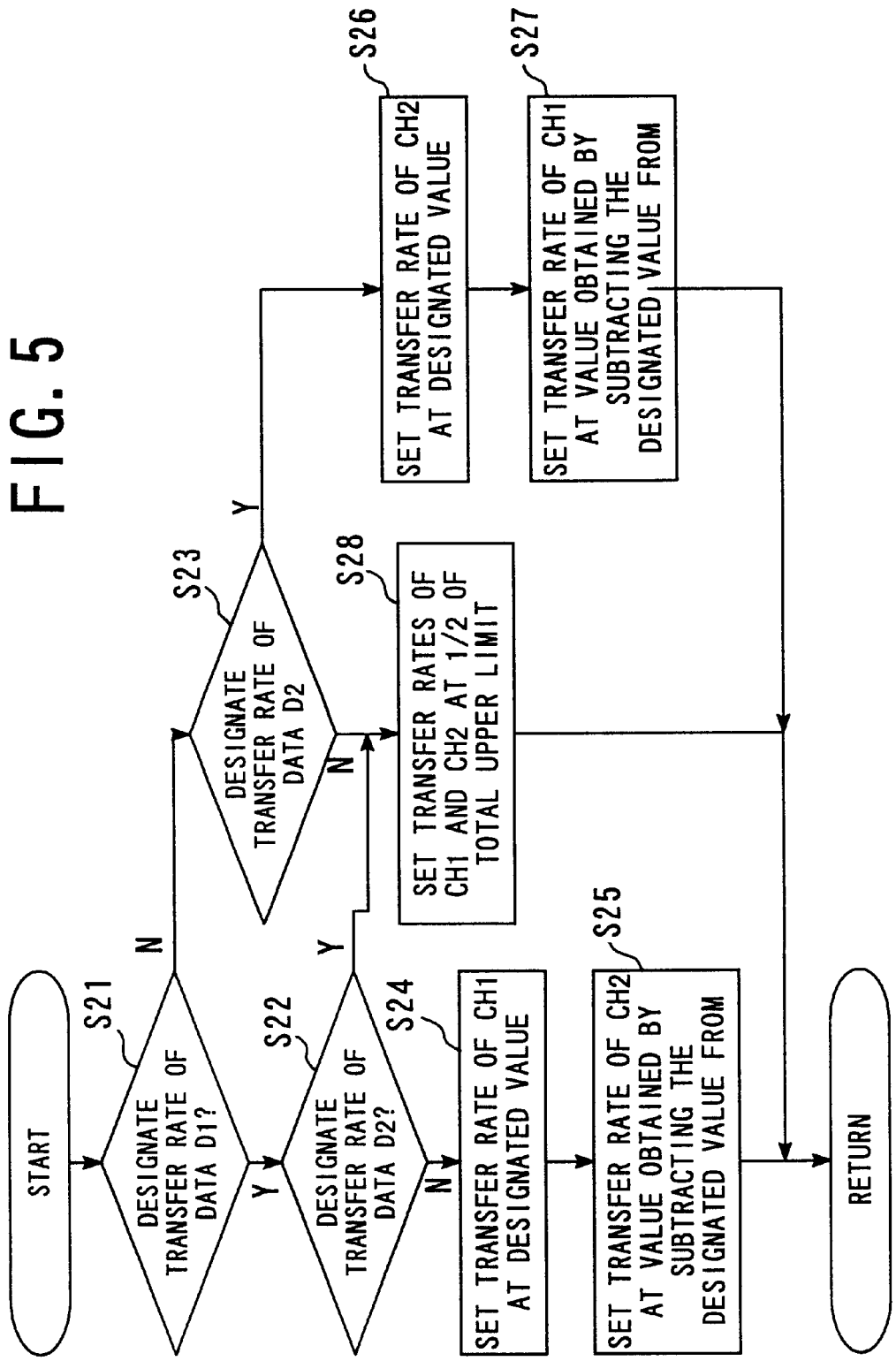
FIG. 5 is a flow chart showing the transfer rate setting process according to the first embodiment of the present invention.

FIG. 5 shows the transfer rate setting process program. The CPU 30 calls the transfer rate setting process program in the step 12 so as to execute the transfer rate setting process according to the transfer rate setting process program. As shown in FIG. 5, the CPU 30, first, determines whether or not the "transfer rate of the picture image data D1" is designated by the user, and whether or not the "transfer rate of the picture image data D2" is designated by the user (steps 21 to 23). Here, the recording/reproducing apparatus 100 has the function that the user can set the image quality of the picture image to be recorded in recording a picture image in the DVD-R 1. The image quality of the picture image is determined by the quantization rate (that is, the compression rate) in the quantization portion 53 of the MPEG encoder 13 (14). As mentioned above, since the "transfer rate of the picture image data D1 (D2)" is determined by the quantization rate, setting of the image quality by the user stands for the designation of the "transfer rate of the picture image data D1 (D2)".

When only the "transfer rate of the picture image data D1" is designated according to the result of the determination, the CPU 30 sets the "transfer rate of the picture image data D1" at a designated value (step 24). Furthermore, the CPU 30 subtracts the value of the "transfer rate of the picture image data D1" set in the step 24 from the total upper limit value, and sets the obtained value as the "transfer rate of the picture image data D2" (step 25).

On the other hand, when only the "transfer rate of the picture image data D2" is designated according to the result of the determination, the CPU 30 sets the "transfer rate of the picture image data D2" at a designated value (step 26). Furthermore, the CPU 30 subtracts the value of the "transfer rate of the picture image data D2" set in the step 26 from the total upper limit value, and sets the obtained value as the "transfer rate of the picture image data D1" (step 27).

Moreover, when both the "transfer rate of the picture image data D1" and the "transfer rate of the picture image data. D2" are designated, or neither is designated according to the result of the determination, the CPU 30 sets the value obtained by dividing the total upper limit value by two as the "transfer rate of the picture image data D1" and the "transfer rate of the picture image data D2", respectively. Then, the process returns to the main program of the recording operation.

As shown in FIG. 4, after finishing the transfer rate setting process, the CPU 30 commands commencement of the compression process to the MPEG encoders 13 and 14. Accordingly, the MPEG encoders 13 and 14 start the compression process. Then, the CPU 30 outputs a write control signal to the logical format buffer 17 (step 13). Accordingly, the picture image data D1 output from the MPEG encoder 13 are stored in the memory area 17A of the logical format buffer 17, and the picture image data D2" output from the MPEG encoder 14 are stored in the memory area 17B of the logical format buffer 17. Then, the CPU 30 continues the process to the step 14 so as to execute the two channel simultaneous recording process.

Figure 6:
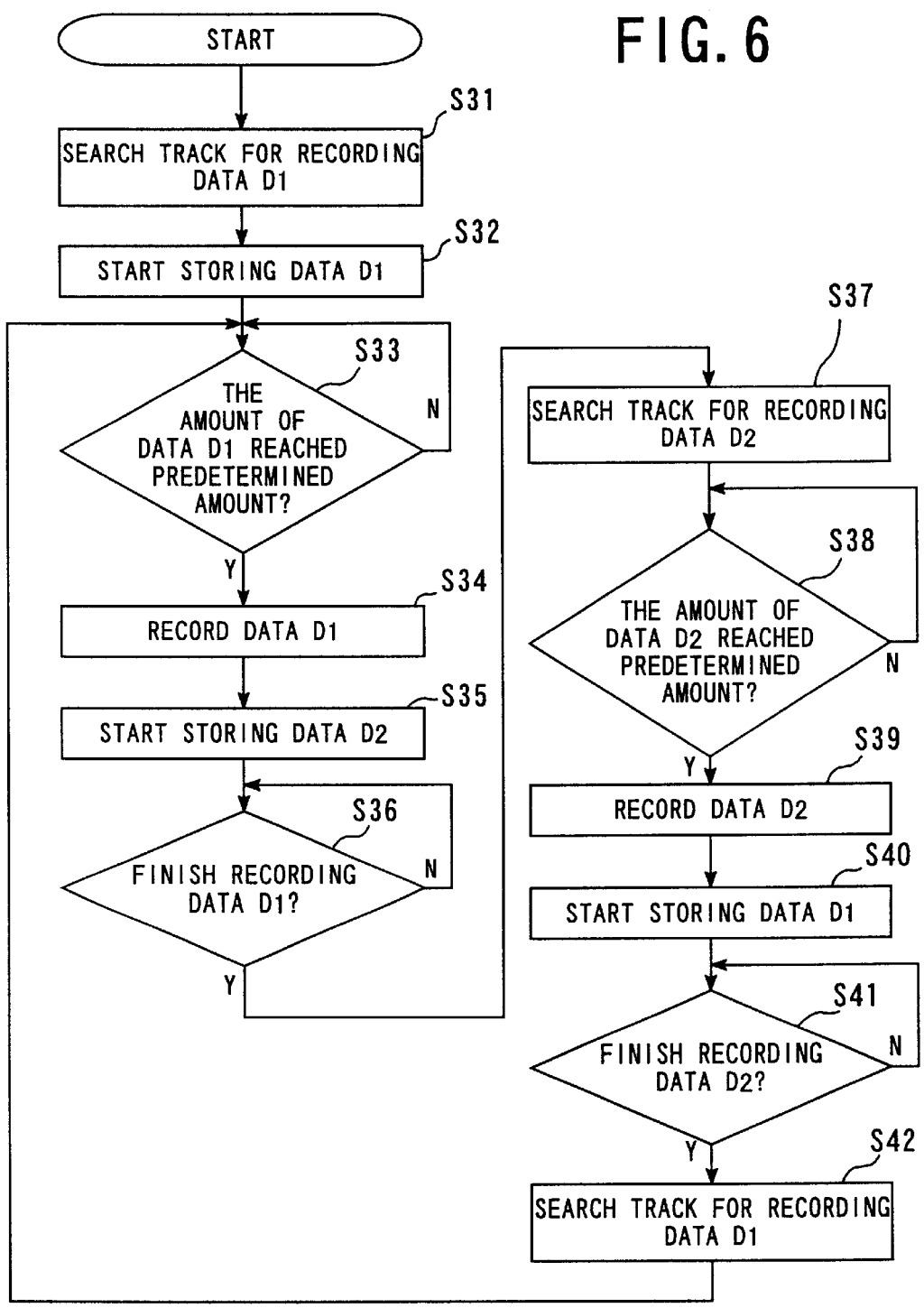
FIG. 6 is a flow chart showing a two channel simultaneous recording process according to the first embodiment of the present invention.

FIG. 6 shows the two channel simultaneous recording process program. The CPU 30 calls the two channel simultaneous recording process program in the step 14 so as to execute the two channel simultaneous recording process according to the two channel simultaneous recording process program. As shown in FIG. 6, the CPU 30, first, searches the tack for recording the picture image data D1 (step 31).

Then, the CPU 30 outputs an address signal and a write control signal to the physical format buffer 19 for selecting the memory area 19A. Then, the CPU 30 outputs an address signal and a write control signal to the logical format buffer 17 for selecting the memory area 17A (step 32). Accordingly, the picture image data D1 stored in the memory area 17A of the logical format buffer 17 are transferred to the memory area 19A of the physical format buffer 19 via the logical formatter 18. In this step, the format of the picture image data D1 is converted by the logical formatter 18.

Then, the CPU 30 determines whether or not the picture image data D1 transferred to the memory area 19A of the physical format buffer 19 has reached a predetermined amount (step 33). In the case the picture image data D1 have not reached the predetermined amount, the CPU 30 monitors the amount of the picture image data D1 being stored in the memory area 19A until the picture image data D1 are stored to the predetermined amount. When the picture image data D1 are stored to the predetermined amount, the CPU 30 outputs an address signal and a read control signal to the physical format buffer 19 for selecting the memory area 19A (step 34). Accordingly, the picture image data D1 stored in the memory area 19A of the physical format buffer 19 are output to the optical pickup 22 via the physical formatter 20 and the signal processing circuit 21. In this step, the format of the picture image data D1 is converted by the physical formatter 20, and furthermore, the picture image data D1 are converted to an NRZI signal by the signal processing circuit 21. Then, the picture image data D1 reached to the optical pickup 22 are recorded in the DVD-R 1 by the optical pickup 22. The above-mentioned predetermined amount is set not to exceed the upper limit value of the memory capacity of the physical format buffer 19.

Furthermore, the CPU 30 outputs an address signal and a write control signal to the physical format buffer 19 immediately after executing the step 34 for selecting the memory area 19B. Then, the CPU 30 outputs an address signal and a read control signal to the logical format buffer 17 for selecting the memory area 17B (step 35). Accordingly, the picture image data D2 stored in the memory area 17B of the logical format buffer 17 are transferred to the memory area 19B of the physical format buffer 19 via the logical formatter 18. In this step, the format of the picture image data D2 is converted by the logical formatter 18.

Then, the CPU 30 determines whether or not the recording operation of the picture image data D1 in the DVD-R 1 is finished (step 36). The recording operation of the picture image data D1 in the DVD-R 1 is finished immediately after the output of all of the picture image data D1 stored in the memory area 19A of the physical format buffer 19. When the recording operation of the picture image data D1 in the DVD-R 1 is finished, the CPU 30 searches the track for recording the picture image data D2 (step 37).

The CPU 30 determines whether or not the picture image data D2 transferred to the memory area 19B of the physical format buffer 19 has reached a predetermined amount (step 38). In the case the picture image data D2 have not reached the predetermined amount, the CPU 30 monitors the amount of the picture image data D2 being stored in the memory area 19B until the picture image data D2 are stored to the predetermined amount. When the picture image data D2 are stored to the predetermined amount, the CPU 30 outputs an address signal and a read control signal to the physical format buffer 19 for selecting the memory area 19B (step 39). Accordingly, the picture image data D2 stored in the memory area 19B of the physical format buffer 19 are output to the optical pickup 22 via the physical formatter 20 and the signal processing circuit 21. In this step, the format of the picture image data D2 is converted by the physical formatter 20, and furthermore, the picture image data D2 are converted to an NRZI signal by the signal processing circuit 21. Then, the picture image data D2 reached to the optical pickup 22 are recorded in the DVD-R 1 by the optical pickup 22.

Furthermore, the CPU 30 outputs an address signal and a write control signal to the physical format buffer 19 immediately after executing the step 39 for selecting the memory area 19A. Then, the CPU 30 outputs an address signal and a read control signal to the logical format buffer 17 for selecting the memory area 17A (step 40). Accordingly, the picture image data D1 stored in the memory area 17A of the logical format buffer 17 are transferred to the memory area 19A of the physical format buffer 19 via the logical formatter

18. In this step, the format of the picture image data D2 is converted by the logical formatter 18.

Then, the CPU 30 determines whether or not the recording operation of the picture image data D2 in the DVD-R 1 is finished (step 41). The recording operation of the picture image data D2 in the DVD-R 1 is finished immediately after the output of all of the picture image data D2 stored in the memory area 19B of the physical format buffer 19. When the recording operation of the picture image data D2 in the DVD-R 1 is finished, the CPU 30 searches the track for recording the picture image data D1 (step 42).

The CPU 30 repeats the process of the above-mentioned steps 33 to 42 until, for example, the user commands the finish of the recording operation. Accordingly, the picture image data D1 and D2 are recorded in the DVD-R 1.

On the other hand, in the case the user inputs the command of not executing the two channel simultaneous recording, that is, the command of executing the one channel recording at the time of the determination in the step 11, the CPU 30 continues the process to the step 15. Then, in the step 15, the recording operation is executed, for example, only for the picture image signal A1.

Figure 7:
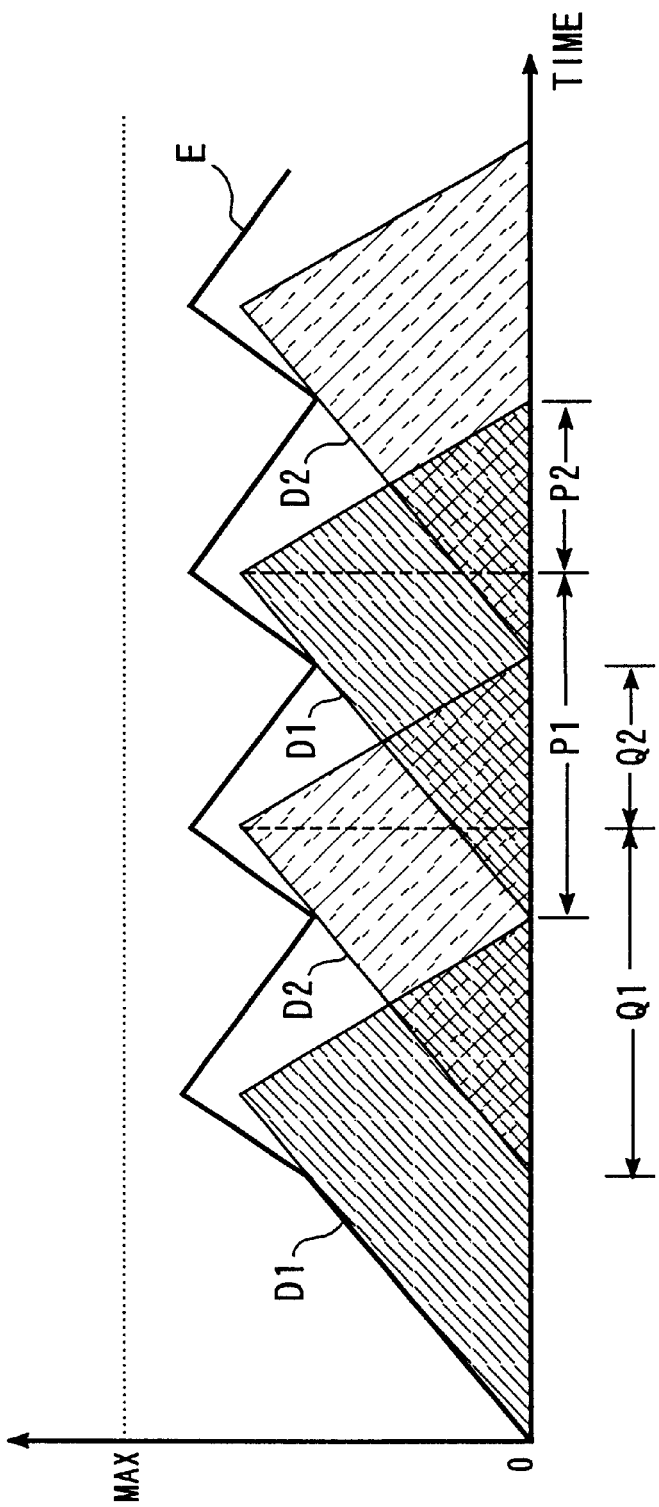
FIG. 7 is a graph for explaining the change of the picture image data in the logical format buffer according to the first embodiment of the present invention.

Here, FIG. 7 shows the change of the amounts of the picture image data D1 and D2 stored in the memory areas 17A and 17B of the logical format buffer 17 while executing the above-mentioned two channel simultaneous recording. The period P1 in FIG. 7 is the period wherein the picture image data D1 output from the MPEG encoder 13 are stored in the memory area 17A of the logical format buffer 17. Since the picture image data D1 stored in the memory area 17A are not transferred to the physical format buffer 19 in the period P1, the amount of the picture image data D1 in the logical format buffer 17 increases gradually. The rate of the increase of the picture image data D1 amount in this period is determined on the whole by the "transfer rate of the picture image data D1".

Moreover, the period P2 is the period wherein the picture image data D1 stored in the memory area 17A are transferred to the physical format buffer 19. In the period P2, although the picture image data D1 output from the MPEG encoder 13 are written in the memory 17A, since the picture image data D1 stored in the memory area 17A are transferred to the physical format buffer 19 at a higher rate, the amount of the picture image data D1 in the logical format buffer 17 decreases gradually. The rate of the decrease of the picture image data D1 amount in this period P2 is determined on the whole by the "transfer rate of the picture image data D1" and the output rate of the logical formatter 18.

On the other hand, the period Q1 is the period wherein the picture image data D2 output from the MPEG encoder 14 are stored in the memory area 17B of the logical format buffer 17. Since the picture image data D2 stored in the memory area 17B are not transferred to the physical format buffer 19 in the period Q1, the amount of the picture image data D2 in the logical format buffer 17 increases gradually. The rate of the increase of the picture image data D2 amount in this period is determined on the whole by the "transfer rate of the picture image data D2".

Moreover, the period Q2 is the period wherein the picture image data D2 stored in the memory area 17B are transferred to the physical format buffer 19. In the period Q2, although the picture image data D2 output from the MPEG encoder 14 are written in the memory 17B, since the picture image data D2 stored in the memory area 17B are transferred to the physical format buffer 19 at a higher rate, the amount of the picture image data D2 in the logical format buffer 17 decreases gradually. The rate of the decrease of the picture image data D2 amount in this period Q2 is determined on the whole by the "transfer rate of the picture image data D2" and the output rate of the logical formatter 18.

Accordingly, the amounts of the picture image data D1 and D2 are each increased and decreased periodically in the logical format buffer 17. However, the increase and decrease pattern of the picture image data D1 amount and the increase and decrease pattern of the picture image data D2 amount are about out of phase by the half cycle with each other. Therefore, on the whole, when the picture image data D1 amount is increased, the picture image data D2 amount is decreased, and when the picture image data D1 amount is decreased, the picture image data D2 amount is increased. Thereby, the total amount F of the picture image data D1 and D2 in the logical format buffer 17 is always maintained without exceeding the upper limit of the memory capacity of the logical format buffer 17.

Figure 8:
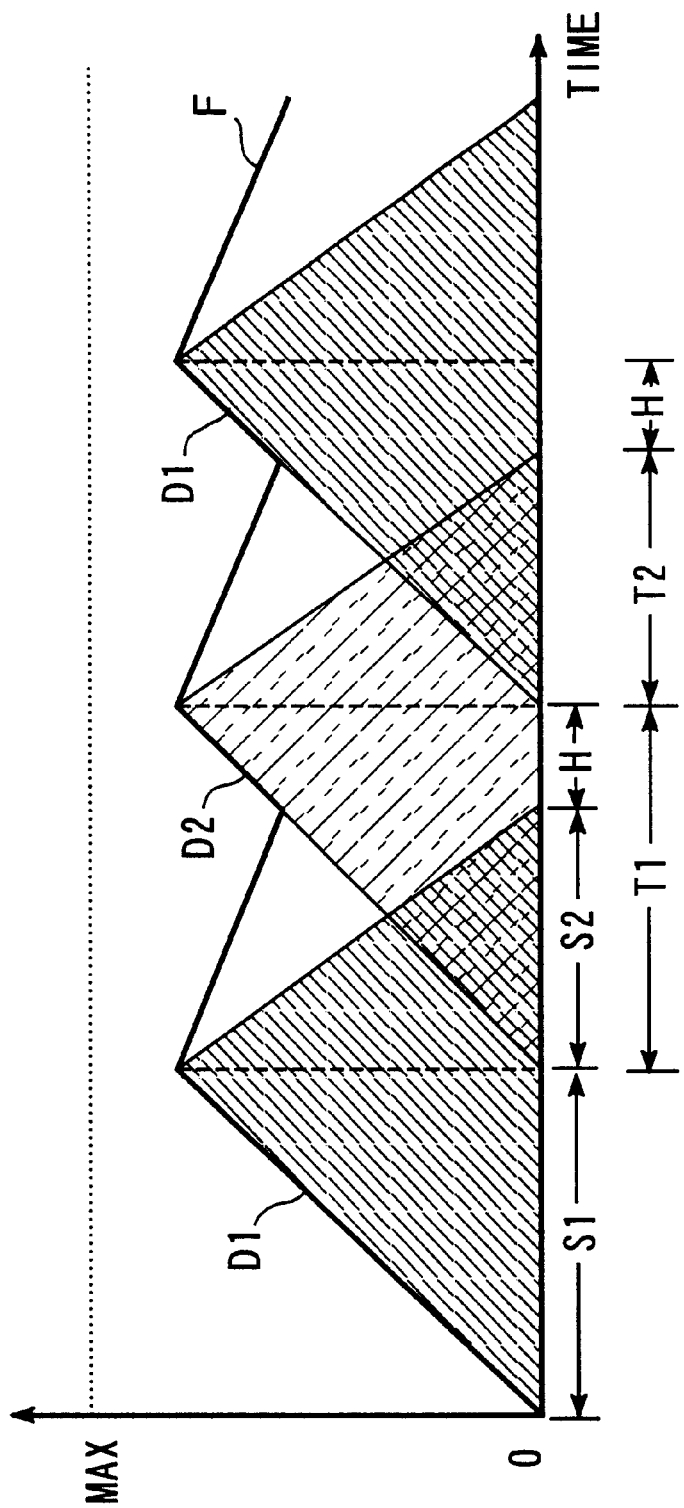
FIG. 8 is a graph for explaining the change of the picture image data in the physical format buffer according to the first embodiment of the present invention.

FIG. 8 shows the change of the amounts of the picture image data D1 and D2 stored in the memory areas 19A and 19B of the physical format buffer 19. The period S1 in FIG. 8 is the period wherein the picture image data D1 transferred from the logical format buffer 17 are stored in the memory area 19A of the physical format buffer 19. Since the picture image data D1 are not recorded in the period S1, the amount of the picture image data D1 in the physical format buffer 19 increases gradually. The rate of the increase of the picture image data D1 amount in this period S1 is determined on the whole by the output rate of the logical formatter 18.

Moreover, the period S2 is the period wherein the picture image data D1 stored in the memory area 19A are recorded in the DVD-R 1. In this period, since the picture image data D1 stored in the memory area 19A are only output to the optical pickup 22 side, the amount of the picture image data D1 in the physical format buffer 19 decreases gradually. The rate of the decrease of the picture image data D1 amount in this period S2 is determined by the recording rate.

On the other hand, the period T1 is the period wherein the picture image data D2 transferred from the logical format buffer 17 are stored in the memory area 19B of the physical format buffer 19. Since the picture image data D2 are not recorded in the period T1, the amount of the picture image data D2 in the physical format buffer 19 increases gradually. The rate of the increase of the picture image data D2 amount in this period T1 is determined on the whole by the output rate of the logical formatter 18.

Moreover, the period T2 is the period wherein the picture image data D2 stored in the memory area 19B are recorded in the DVD-R 1. In this period, since the picture image data D2 stored in the memory area 19B are only output to the optical pickup 22 side, the amount of the picture image data D2 in the physical format buffer 19 decreases gradually. The rate of the decrease of the picture image data D2 amount in this period T2 is determined by the recording rate.

Accordingly, the amounts of the picture image data D1 and D2 are each increased and decreased periodically in the physical format buffer 19. However, the increase and decrease pattern of the picture image data D1 amount and the increase and decrease pattern of the picture image data D2 amount are out of phase by the half cycle with each other. Therefore, on the whole, when the picture image data D1 amount is increased, the picture image data D2 amount is decreased, and when the picture image data D1 amount is decreased, the picture image data D2 amount is increased. Thereby, the total amount F of the picture image data D1 and D2 in the physical format buffer 19 cannot exceed the upper limit of the memory capacity of the physical format buffer 19.

Furthermore, the rate of the decrease of the picture image data D1 amount in the period S2 is higher than the rate of the increase of the picture image data D2 amount in the period T1. Thereby, the period H for searching the track can be set for preparing for recording the next picture image data. That is, the output rate and the recording rate of the logical formatter 18 are set such that the track searching period H can be set sufficiently and appropriately.

Figure 9:
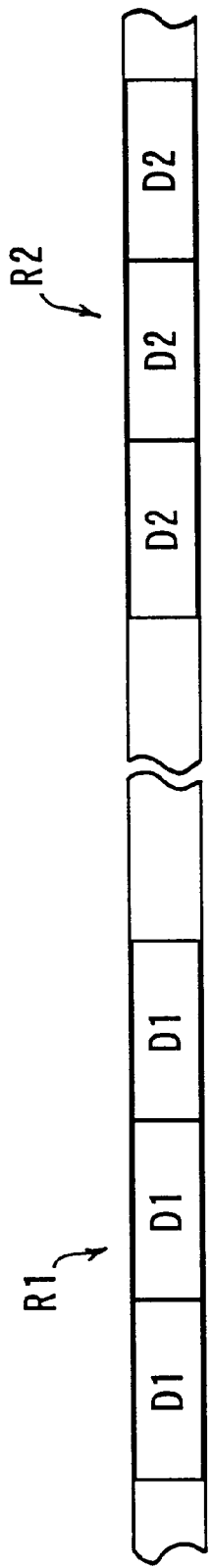
FIG. 9 is a diagram showing an example of a recording track position of picture image data according to the first embodiment of the present invention.

Then, the recording track positions of the picture image data D1 and D2 on the DVD-R 1 will be explained with reference to FIGS. 9 and 10. FIG. 9 shows a spiral track formed on the DVD-R 1 illustrated linearly for the convenience of the explanation. As shown in FIG. 9, the recording/reproducing apparatus 100 according to this embodiment records the picture image data D1 in the inner circumference side region R1 of the DVD-R 1 and the picture image data D2 in the outer circumference side area R2 of the DVD-R 1. Therefore, in the recording operation, whenever recording of the picture image data D1 and recording of the picture image data D2 are switched, the searching operation (track jump) is repeated between the inner circumference side area R1 and the outer circumference area R2 of the DVD-R. By completely separating the recording domains of the picture image data D1 and D2 accordingly, for example, in reproducing the picture image data D1, the inner circumference side area R1 of the DVD-R 1 can be read out continuously. Therefore, the reproducing operation can be executed efficiently.

Figure 10:
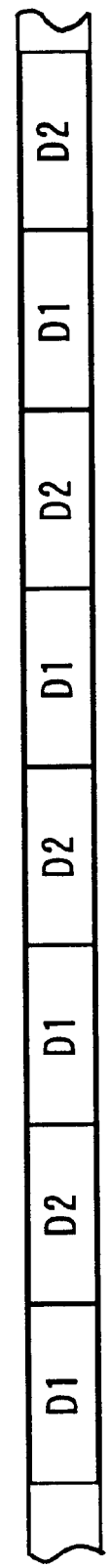
FIG. 10 is a diagram showing another example of a recording track position of picture image data according to the first embodiment of the present invention.

The present invention is not limited thereto but as shown in FIG. 10, the picture image data D1 and the picture image data D2 can be recorded alternately on the track. Accordingly, a long track jump in the recording operation can be avoided, and thus the efficiency of the recording operation can be improved.

The reproducing operation of the recording/reproducing apparatus 100 according to this embodiment will be explained with reference to FIG. 11.

Figure 11:
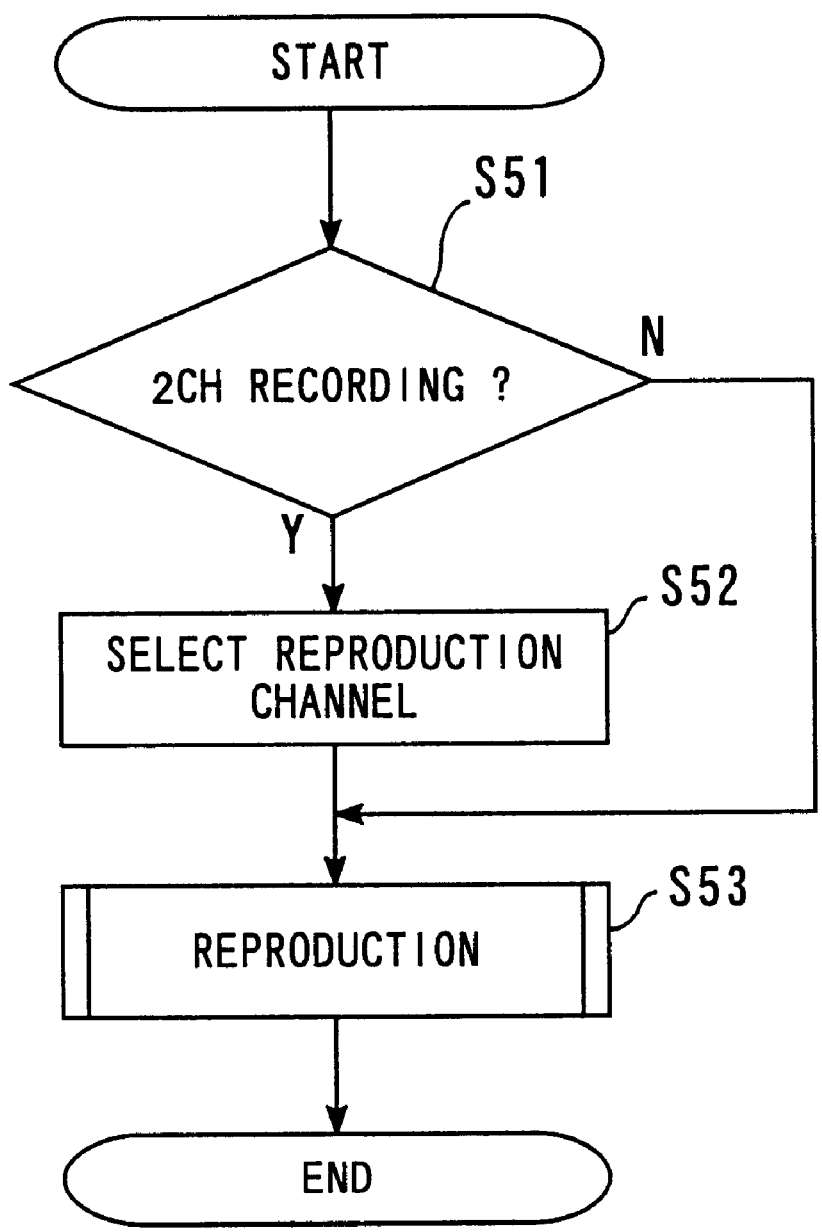
FIG. 11 is a flow chart showing a reproducing operation according to the first embodiment of the present invention.

FIG. 11 shows a reproducing operation program. When the reproducing operation is started, the CPU 30 determines whether or not the DVD-R 1 to be reproduced is recorded by the two channel simultaneous recording (step 51). This can be realized by recording identity data of the two channel simultaneous recording in the DVD-R 1 as control data at the time of executing the two channel simultaneous recording, and detecting the identity data in this step 51.

In the case the DVD-R 1 to be reproduced is recorded by the two channel simultaneous recording, the CPU 30 selects the picture data to be reproduced (step 52). The picture image data to be reproduced are determined on the basis of the manual command by the user. Then, the CPU 30 reproduced the selected picture image data (step 53).

As heretofore mentioned, the recording/reproducing apparatus 100 according to this embodiment can receive the two channel picture image signals A1 and A2 simultaneously and record the picture image data D1 and D2 corresponding to the picture image signals A1 and A2 simultaneously. Moreover, the image quality of the picture image to be recorded in the DVD-R 1 can be set freely by changing the quantization rate in the quantization portion 53 of the MPEG encoder 13 (14) under the control of the CPU 30.

2. Second Embodiment

The second embodiment of the present invention will be explained with reference to FIG. 12. In a recording/reproducing apparatus 200 according to this embodiment shown in FIG. 12, the components the same as those of the recording/reproducing apparatus 100 according to the first embodiment shown in FIG. 1 are applied with the same numerals, and further explanation is not given here.

Figure 12:
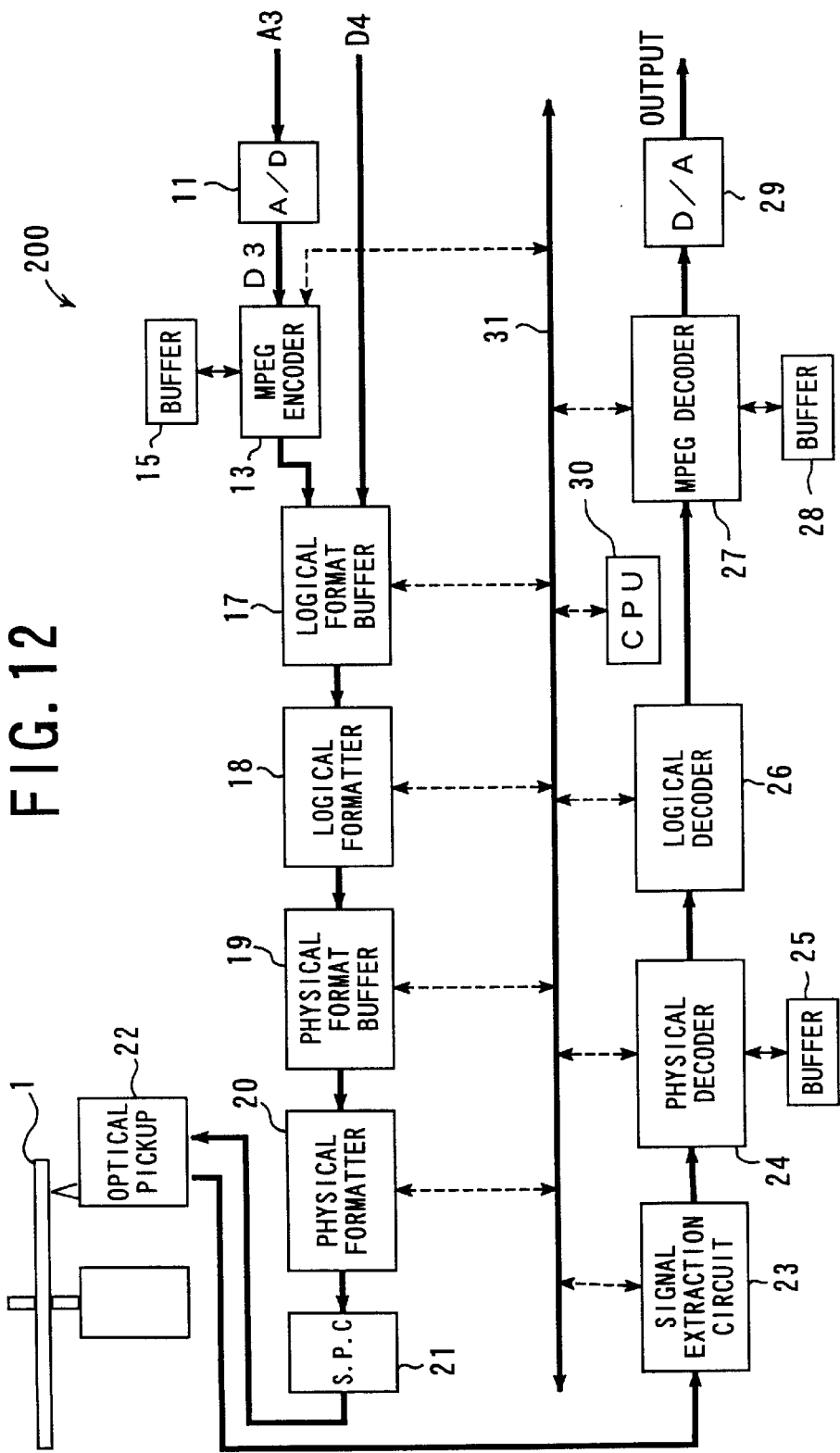
FIG. 12 is a block diagram showing a recording/reproducing apparatus according to a second embodiment of the present invention.

As shown in FIG. 12, it is characteristic of the recording/reproducing apparatus 200 according to this embodiment that an analog picture image signal A3 is input as one of the two channel inputs, and a digital picture image signal D4 is input as the other one. The digital picture image signal D4 is, for example, transmitted from a digital satellite broadcast station. Moreover, since the picture image signal is a digital signal, unlike the recording/reproducing apparatus 100 according to the first embodiment, the A/D converter and the MPEG encoder are not required. Furthermore, since the MPEG encoder is not provided for the input of the digital picture image signal D4, the transfer rate of the digital picture image signal D4 is fixed. That is, the transfer rate of the digital picture image signal D4 is the transfer rate set by a digital satellite broadcast station. On the other hand, since the analog picture image signal A3 is output to the logical format buffer 17 via the MPEG encoder 13 after being converted to picture image data D3 by the A/D converter 11, the "transfer rate of the picture image data D3" can be changed under a predetermined limitation by controlling the quantization rate in the quantization portion of the MPEG encoder 13 by the CPU 30, and thus the image quality of the picture image signal A3 can be changed within a predetermined range.

In this embodiment with the above-mentioned configuration, the effect substantially the same as that of the above-mentioned first embodiment can be obtained.

3. Third Embodiment

The third embodiment of the present invention will be explained with reference to FIGS. 13 and 14. In this embodiment, the components the same as those of the recording/reproducing apparatus 100 according to the first embodiment shown in FIG. 1 are applied with the same numerals, and further explanation is not given here.

Figure 13:
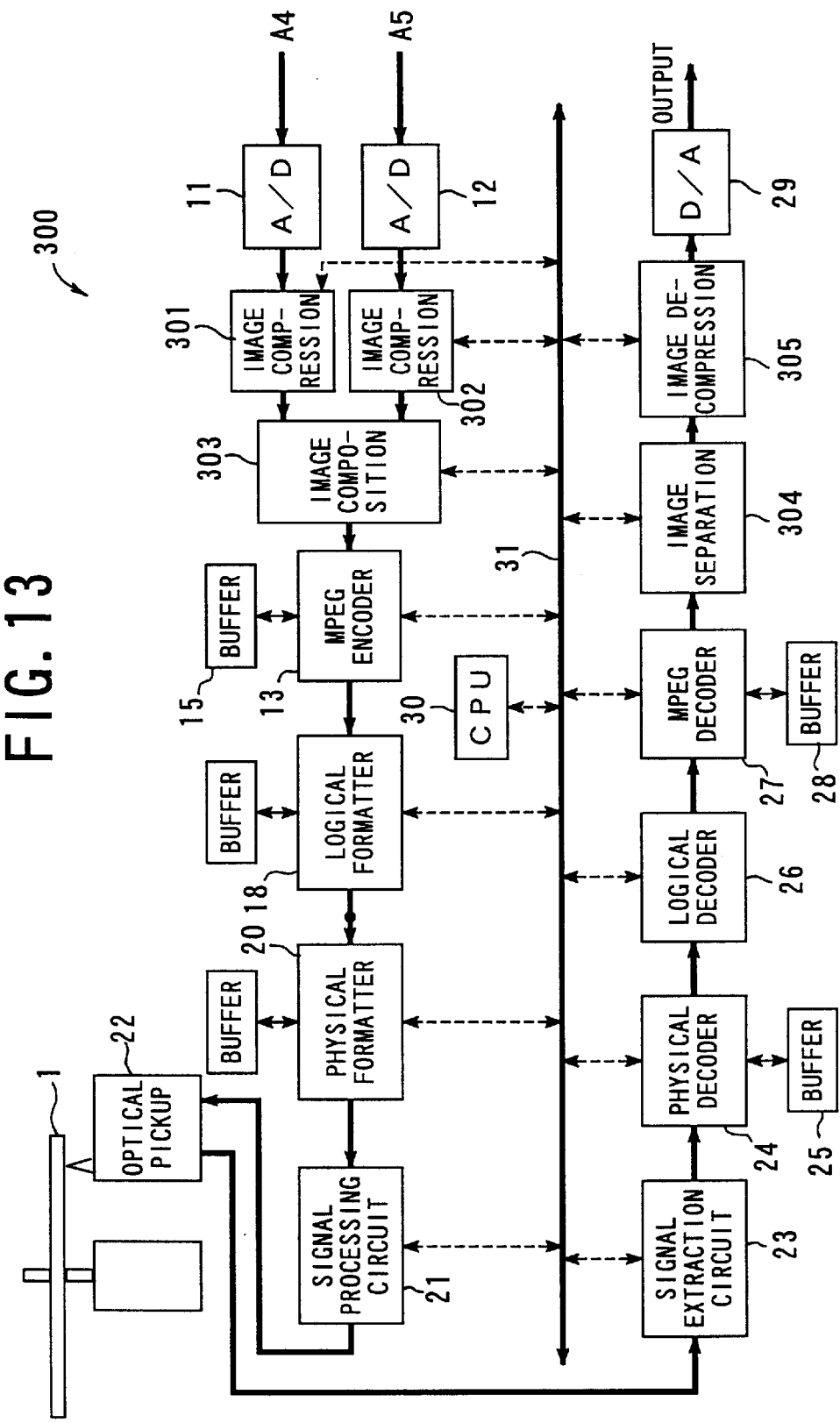
FIG. 13 is a block diagram showing a recording/reproducing apparatus according to a third embodiment of the present invention.

FIG. 13 shows a recording/reproducing apparatus 300 according to this embodiment. In comparison with the above-mentioned recording/reproducing apparatus 100 according to the first embodiment, it is characteristic of the recording/reproducing apparatus 300 according to this embodiment that the recording section comprises image compression portions 301 and 302 and an image composition portion 303, and the reproducing section comprises an image separation portion 304 and an image decompression portion 305.

Figure 14:
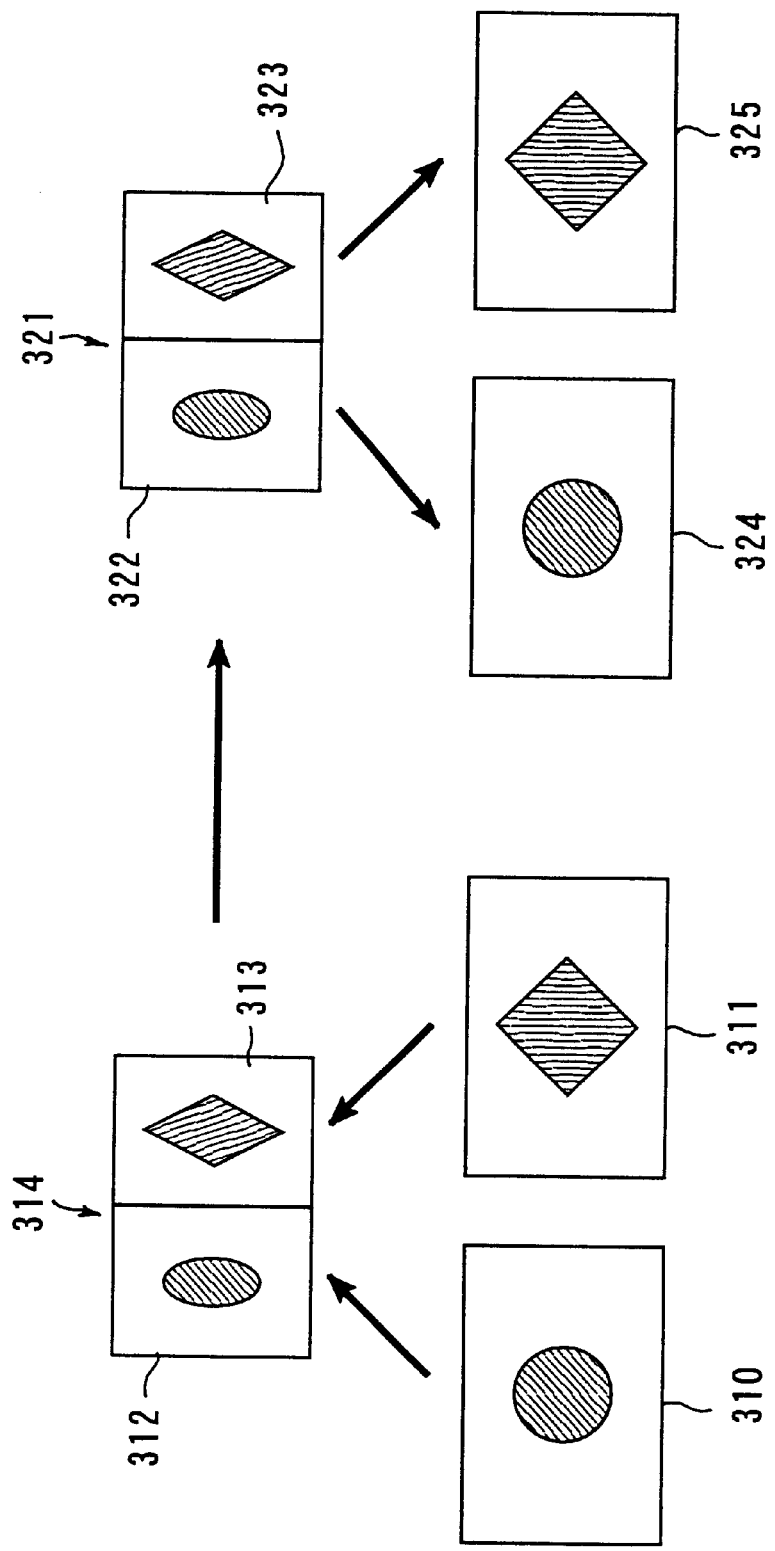
FIG. 14 is a diagram for explaining a compressed image according to the third embodiment of the present invention.

As shown in FIG. 14, the image compression portion 301 is a device for generating a compressed picture image 312 by compressing a picture image 310 corresponding to a digital picture image signal D4 obtained by converting an analog picture image signal A4 by the A/D converter 11 so as to have the length in the lateral direction (horizontal direction) to half. Similarly, the image compression portion 302 is a device for generating a compressed picture image 313 by compressing a picture image 311 corresponding to a digital picture image signal D5 obtained by converting an analog picture image signal A5 by the A/D converter 12 so as to have the length in the lateral direction (horizontal direction) to half.

The image composition portion 303 is a device for producing a synthesized image 314 by arranging the compressed picture images 312 and 313 produced by the image compression portions 301 and 302 side by side laterally for synthesizing the compressed picture images as shown in FIG. 14. The synthesized picture image 314 is output to the MPEG encoder 13. Hereinafter, substantially similarly to the recording/reproducing apparatus 100 according to the first embodiment, after executing the compression process according to the MPEG system, the format conversion by the logical formatter 18, the format conversion by the physical formatter 20, or the like, the synthesized picture image 314 is recorded in the DVD-R 1.

In reproducing the DVD-R 1 with the picture image data recorded by the recording/reproducing apparatus 300 according to this embodiment, substantially similarly to the recording/reproducing apparatus 100 according to the first embodiment, a reproduced signal read out from the DVD-R 1 is applied with the decoding process by the physical decoder 24, the decoding process by the logical decoder 26 and the decompressing process by the MPEG decoder 27. Accordingly, as shown in FIG. 14, a synthesized picture image 321 including the two compressed picture images 322 and 323 compressed by half in the lateral direction can be obtained, and picture image data corresponding to the synthesized picture image 321 are output to the image separation portion 304.

As shown in FIG. 14, the image separation portion 304 is a device for separating the synthesized picture image 321 including the compressed picture images 322 and 323 compressed by half in the lateral direction in two. Moreover, the image decompression portion 305 is a device for expanding each of the separated compressed picture images 322 and 323 by double in the lateral direction. Accordingly, the picture images 324 (310) and 325 (311) corresponding to the picture image data D4 and D5 can be reproduced.

According to the recording/reproducing apparatus 300 according to this embodiment with the above-mentioned configuration, the two channel picture image signals can be recorded simultaneously.

Although the cases of simultaneously recording the two channel picture image signals have been explained in the above-mentioned first to third embodiments, the present invention is not limited thereto, but may have a configuration for simultaneously recording the picture image of the three or more channels, for example, four, five, six or eight channels.

Moreover, although the cases of recording and reproducing the picture image signals (picture image data) as the information have been explained in the above-mentioned first to third embodiments, the present invention is not limited thereto, but may have a configuration for recording and reproducing another kind of information, such as a sound signal (sound data), or the like.

Furthermore, although the cases of using a DVD-R as the recording medium have been explained in the above-mentioned first to third embodiments, the present invention is not limited thereto, but other recording media, such as a CD-R can be used.

Moreover, although the present invention is adopted in the recording/reproducing apparatus 100 (200, 300) in the above-mentioned first to third embodiments, the present invention can be used also in a recording apparatus without a reproducing function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese patent application no. 10-287030 filed on Oct., 8, 1998 including the specification, claims, drawings and summary is incorporated herein by reference in its entirety.

What is claimed is:

1. An information recording apparatus comprising:
   a transferring device that separately and simultaneously receives at least two information supplied through at least two channels, and separately and simultaneously transfers the at least two information to a storing device at separate transfer rates, thereby storing the at least two information into the storing device;
   a recording device that alternately reads the at least two information from the storing device, and alternately records the at least two information read from the storing device onto a recording medium at a constant recording rate; and
   a transfer rate setting device that sets the respective transfer rates to make a total of the transfer rates smaller than the recording rate by changing the transfer rates independently of one another.

2. The information recording apparatus according to claim 1, wherein:
   the transferring device comprises a compression device that separately compresses the at least two information at separate compression ratios; and
   the transfer rate setting device comprises a compression ratio setting device that sets the respective compression ratios to make the total of the transfer rates smaller than the recording rate.

3. An information recording apparatus comprising:
   a transferring device that separately and simultaneously receives at least first and second data streams supplied through at least first and second channels, and separately and simultaneously transfers the at least first and second data streams to a storing device at first and second transfer rates respectively, thereby storing the at least two data streams into the storing device;
   a recording device that alternately reads the at least first and second data streams from the storing device, and alternately records the at least first and second data streams read from the storing device onto a recording medium at a constant recording rate; and
   a transfer rate setting device that sets the first and second transfer rates so that a total of the first and second transfer rates is smaller than the recording rate;
   wherein the recording device comprises:
   a selection device that alternately selects one of the at least first and second data streams stored in the storing device;
   a detection device that detects an amount of each of the at least first and second data streams stored in the storing device;
   a determination device that determines on the basis of a detection of the detection device whether or not the amount of the one of the at least first and second data streams selected by the selection device has reached a predetermined amount; and
   a recording control device that records the one of the at least first and second data streams selected by the selection device onto the recording medium when the determination device determines that the amount of the one of the at least first and second data streams selected by the selection device has reached the predetermined amount.

4. The information recording apparatus according to claim 1, wherein the recording device continuously arranges the at least two information read from the storing device on the recording medium in a reading order.

5. The information recording apparatus according to claim 1, wherein the recording device continuously arranges one of the at least two information read from the storing device on a first area on the recording medium, the recording device continuously arranges another one of the at least two information read from the storing device on a second area on the recording medium, and the first area and the second area are separately formed on the recording medium.

6. A video data recording apparatus comprising:

a transferring device that separately and simultaneously receives a first video data transmitted through a first channel and a second video data transmitted through a second channel, and separately and simultaneously transfers the first video data and the second video data to a storing device at separate transfer rates, thereby storing the first video data and the second video data into the storing device;

a recording device that alternately reads the first video data and the second video data from the storing device, and alternately records the first video data and the second video data read from the storing device onto a recording medium at a constant recording rate; and a transfer rate setting device that sets the respective transfer rates to make a total of the transfer rates smaller than the recording rate by changing the transfer rates independently of one another.

7. The video data recording apparatus according to claim 6, wherein:

the transferring device comprises a compression device that separately compresses the first video data and the second video data at separate compression ratios; and the transfer rate setting device comprises a compression ratio setting device that sets the respective compression ratios to make the total of the transfer rates smaller than the recording rate.

8. A video data recording apparatus comprising:

a transferring device that separately and simultaneously receives a first video data transmitted through a first channel and a second video data transmitted through a second channel, and separately and simultaneously transfers the first video data and the second video data to a storing device at first and second transfer rates respectively, thereby storing the first video data and the second video data into the storing device;

a recording device that alternately reads the first video data and the second video data from the storing device, and alternately records the first video data and the second video data read from the storing device onto a recording medium at a constant recording rate; and a transfer rate setting device that sets the first and second transfer rates so that a total of the first and second transfer rates is smaller than the recording rate;

wherein the recording device comprises:

a selection device that alternately selects one of the first video data and the second video data stored in the storing device;

a detection device that detects an amount of each of the first video data and the second video data stored in the storing device;

a determination device that determines on the basis of a detection of the detection device whether or not the amount of the one of the first video data and the second video data selected by the selection device has reached a predetermined amount; and a recording control device that records the one of the first video data and the second video data selected by the selection device onto the recording medium when the determination device determines that the amount of the one of the first video data and the second video data selected by the selection device has reached the predetermined amount.

9. The video data recording apparatus according to claim 6, wherein the recording device continuously arranges the first video data and the second video data read from the storing device on the recording medium in a reading order.

10. The video data recording apparatus according to claim 6, wherein the recording device continuously arranges the first video data read from the storing device on a first area on the recording medium, the recording device continuously arranges the second video data read from the storing device on a second area on the recording medium, and the first area and the second area are separately formed on the recording medium.

11. The information recording apparatus according to claim 1, further comprising a determining device that determines whether or not a transfer rate is designated for either of the two channels.

12. The video data recording apparatus according to claim 6, further comprising a determining device that determines whether or not a transfer rate is designated for either of the two channels.

* * * * *